United States Patent
Gupta et al.

(10) Patent No.: US 11,616,883 B2
(45) Date of Patent: Mar. 28, 2023

(54) SYSTEMS AND METHODS FOR IMPROVED AUDIO/VIDEO CONFERENCES

(71) Applicant: Rovi Guides, Inc., San Jose, CA (US)

(72) Inventors: Vikram Makam Gupta, Karnataka (IN); Pooja Srivastava, Bengaluru (IN)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 17/158,823

(22) Filed: Jan. 26, 2021

(65) Prior Publication Data

US 2022/0239780 A1 Jul. 28, 2022

(51) Int. Cl.
*H04M 3/56* (2006.01)

(52) U.S. Cl.
CPC ........... *H04M 3/568* (2013.01); *H04M 3/566* (2013.01)

(58) Field of Classification Search
CPC ........... H04M 3/56–569; H04M 2203/50–509
USPC ................... 348/14.01–14.16; 370/259–271, 370/351–357; 379/21.01, 202.01–207.01, 379/67.1–88.28; 709/201–207, 217–248
See application file for complete search history.

(56) References Cited

U.S. PATENT DOCUMENTS

| | | | | |
|---|---|---|---|---|
| 9,843,673 B1* | 12/2017 | Chug | ................ | H04L 65/1059 |
| 10,229,111 B1* | 3/2019 | Filippova | ............... | G06F 40/30 |
| 2004/0263636 A1* | 12/2004 | Cutler | ..................... | H04N 7/15 |
| | | | | 348/211.12 |
| 2005/0216549 A1* | 9/2005 | Amano | ................. | G06Q 30/02 |
| | | | | 709/227 |
| 2006/0171515 A1* | 8/2006 | Hintermeister | .... | H04N 21/4852 |
| | | | | 379/110.01 |
| 2007/0177633 A1* | 8/2007 | Wu | ..................... | H04L 47/2416 |
| | | | | 370/516 |
| 2009/0220064 A1* | 9/2009 | Gorti | ..................... | H04M 3/568 |
| | | | | 379/202.01 |
| 2009/0327425 A1* | 12/2009 | Gudipaty | ........... | H04L 65/1093 |
| | | | | 709/205 |
| 2014/0320588 A1* | 10/2014 | Midtun | ................. | H04N 7/155 |
| | | | | 348/14.08 |
| 2017/0220997 A1* | 8/2017 | Shima | .................... | G10L 15/02 |
| 2021/0011937 A1* | 1/2021 | Boni | ..................... | G06F 40/258 |
| 2021/0012069 A1* | 1/2021 | Kamigaito | ........... | G06F 40/284 |

* cited by examiner

*Primary Examiner* — Hemant S Patel
(74) *Attorney, Agent, or Firm* — Haley Guiliano LLP

(57) ABSTRACT

Systems and methods for efficient management of an audio/video conference are disclosed. The methods comprise recording voice data of a first user connected to a conference while the user is in a first state, determining the first user is talking while in the first state, and initiating playback of the recorded voice data of the first user to a plurality of other users, wherein a playback rate of the recorded voice data is variable.

17 Claims, 9 Drawing Sheets

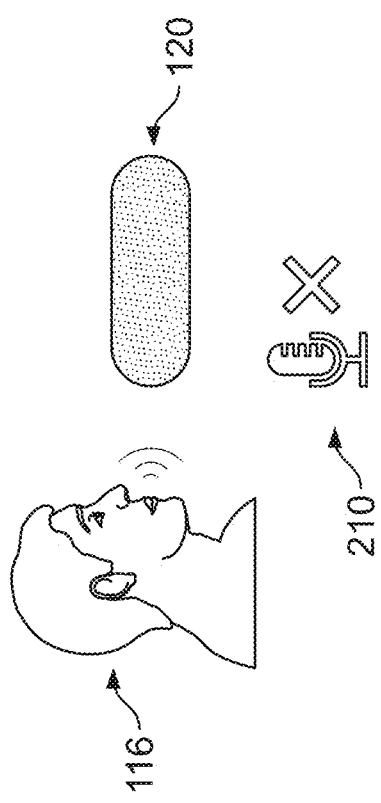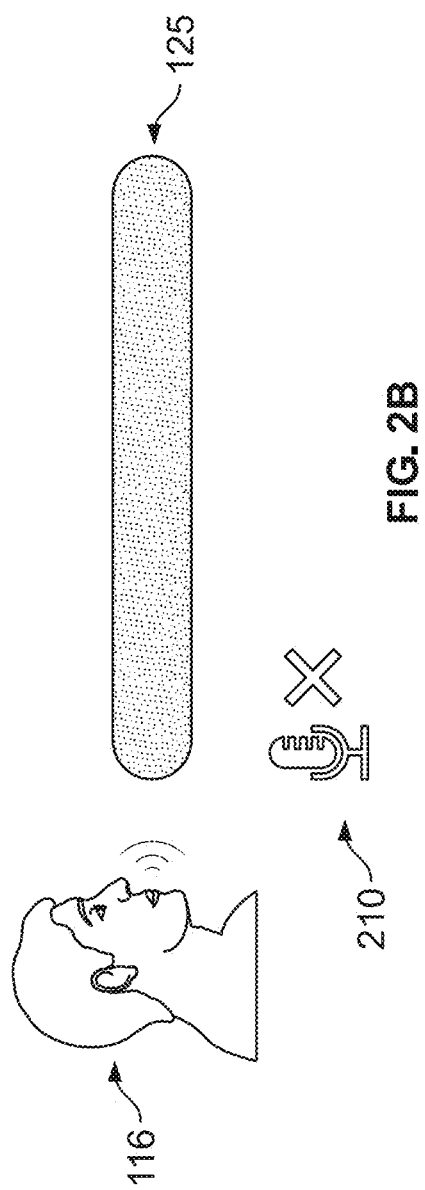

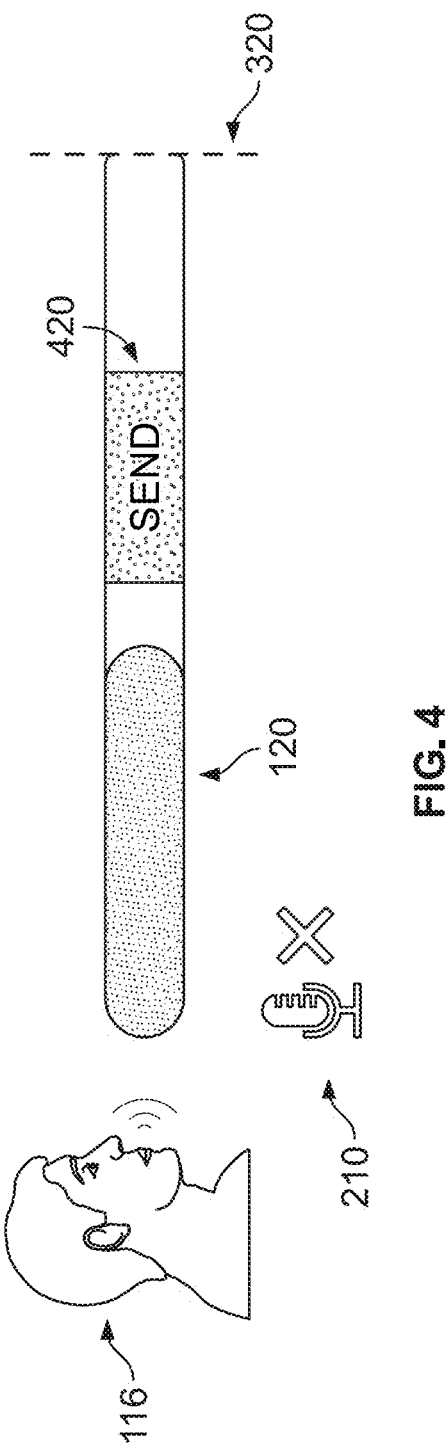

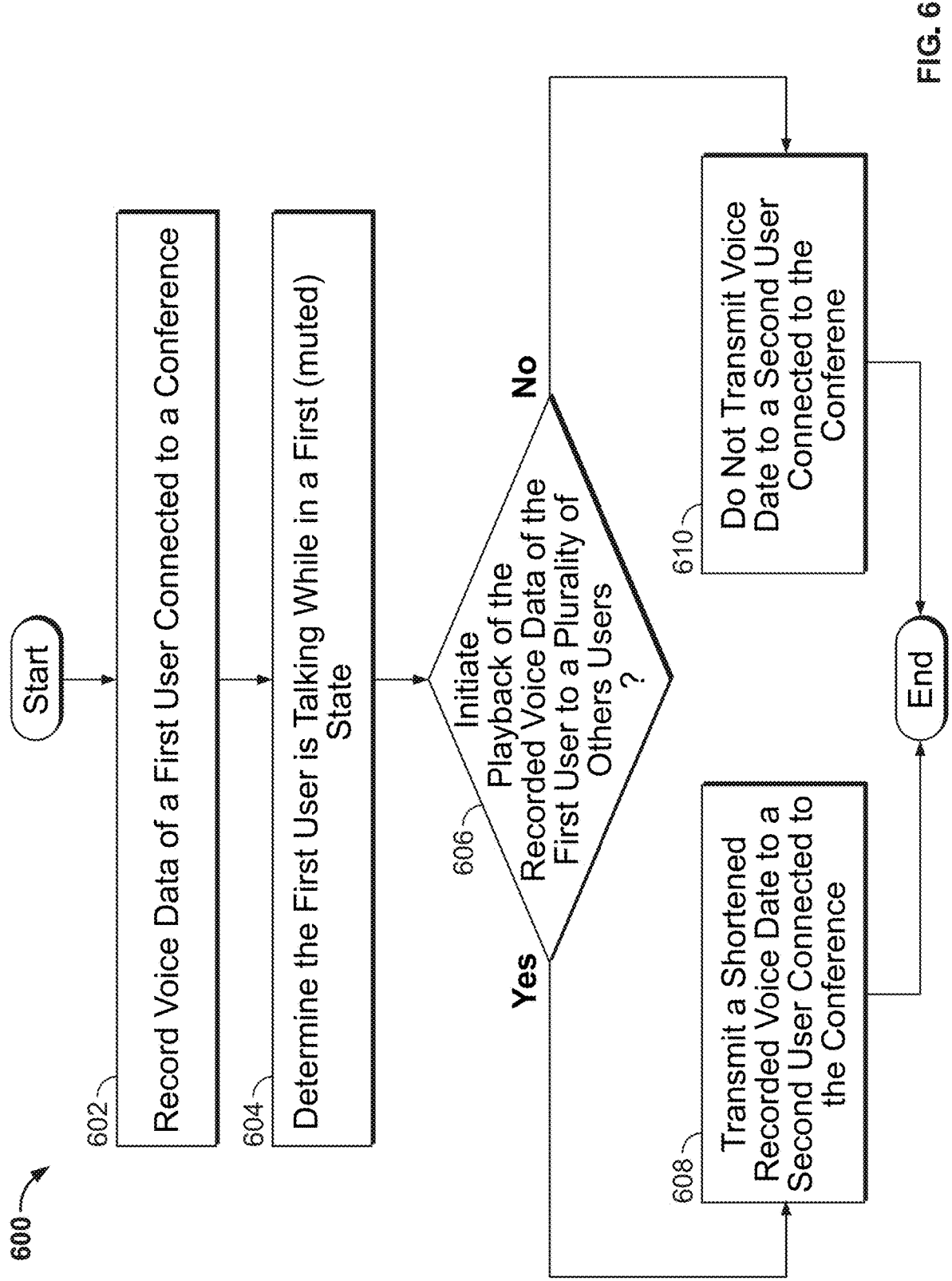

SYSTEMS AND METHODS FOR IMPROVED AUDIO/VIDEO CONFERENCES

BACKGROUND

The present disclosure relates to audio/video conferencing systems and methods and, more particularly, to systems and methods to handle speaking while on mute scenarios during audio/video conferences.

SUMMARY

Recently, the use of audio/video conferencing systems has become increasingly popular. These audio/video conferencing systems are adapted to provide multi-party audio/video conferences where many participants participate in an audio/video conference through interaction with an audio/video-conferencing server via a personal computing device such as a laptop, smartphone, tablet or the like.

Conventional audio conferencing systems have a series of listeners or participants at geographically dispersed locations with each listener participant having audio input equipment such as microphones or the like in addition to audio output equipment such as speakers, headphones, or the like for listening to other participants. The audio input and output devices are normally interconnected by means of an electronic audio signalling path, and often, though not restricted to, a central server. The central server is responsible for managing the incoming audio from each of the participants. Often, the central server collects audio from all participants and transmits the combined signal to be played to each participant in real time. The conferencing system may be a peer-to-peer conference, where each device of each participant transmits the participant's voice data to each other device and initiates playback of all received audio signals in real time.

Often, when the participants of the audio/video conferencing systems are not talking or not engaging with the conference, they mute themselves so they cannot be heard or to avoid interrupting the current speaker. In addition, when joining a meeting late, or if the organizer of the audio/video conference mandates it, the user is often muted automatically when joining the audio/video conference. Moreover, often the presenter/organizer of an audio/video conference has mute/unmute control over the participants of the conference.

In one approach, available audio/video conferencing systems provide a "Mute All" option to the presenter. The presenter is therefore able to mute all participants while giving their presentation and can unmute everyone when they are ready to take questions. Unfortunately, such systems have several drawbacks. In this approach, important questions or comments from other participants may be lost (e.g., if the user is unaware they have been muted by the presenter when they attempt to talk).

In another approach, available audio/video conferencing systems provide a "Mute on joining" option to the presenter or host when setting up the audio/video conference. The participants may therefore not be aware that they are muted upon joining the audio/video conference and may begin talking while muted. In this approach, important comments from participants are missed or must be repeated after the participant is unmuted.

In the above approaches, participants, for example, may have important input to provide during specific portions of the presentation that may be missed by the presenter when the "Mute all" or "Mute on joining" option is engaged. Moreover, participants may lose interest or forget their questions or comments about an earlier portion of the presentation if they are unable to interact with the presenter in real time, or have to wait until a specific question-and-answer part of the audio/video conference. Therefore, participants can often miss out on valuable insight or questions from other participants connected to the conference.

Thus, participants are often not aware they are muted or forget they muted themselves when they begin speaking, and their voice data is not transmitted to the other participants of the audio/video conference. The muted participant attempting to talk to the other conference participants often realizes after some time, or when another participant notifies the speaker, and thus the participant attempting to talk to the conference has to stop talking, unmute themselves, and repeat everything they said while muted. This results in a sub-optimal user experience and reduces the efficiency of the entire meeting. Recently, users have begun to refer to Zoom or Teams fatigue: when people are on calls almost the entire day, they don't want any meetings prolonged due to such inefficiencies and there is a need to improve the efficiency of audio/video conferences.

Lack of management of audio input from participants can further contribute to adverse user experience when two or more participants speak at the same time, when one or more of the participants is muted. In some cases, the participants may each unmute themselves and begin to repeat their questions or make statements simultaneously. The presenter is therefore forced to ask each participant to speak in turn and repeat their statements or questions, wasting time and disturbing the flow of the presentation.

Audio-conferencing mechanisms, techniques, and systems described herein are introduced to facilitate convenient and efficient discussion among a plurality of participants connected to an audio/video conference.

In one embodiment, the audio/video audio conference system automatically records everything a muted participant is saying and provides an efficient way of delivering the audio and/or video of the muted participant to the conference and the rest of the participants without requiring the current participant to repeat their speech. In one embodiment, the method comprises recording voice data of a first user (e.g. a participant) connected to a conference while the user is in a first state, determining the first user is talking while in the first state, and initiating playback of the recorded voice data of the first user to a plurality of other users, wherein a playback rate of the recorded voice data is variable. In some embodiments, the first state is a muted state.

With current systems, when a participant is determined to be talking while muted, their voice data will not be sent to the other participants of the audio/video conference, and they would have to repeat themselves after unmuting. Therefore, some embodiments of the present disclosure enable the participant to initiate playback of their voice recorded while they were in a muted (e.g., a first) state. However, upon initiating playback of the recorded voice data, the rest of the participants will not be at a current "live" state of the conference.

In some embodiments, the playback rate of the recorded voice data is variable. The variable playback rate of the recorded voice data is useful because once the other participants begin listening to the recorded message of the muted participant, they will be behind the current "live" audio/video conference. That is to say that, the muted participant will be the only participant who is "live"; the other participants will be lagging behind while they catch up with the recorded voice data that was missed due to the first participant being muted. Therefore, in some embodiments, the system tries to catch the rest of the participants back up to the current participant's live speech point. There are many examples provided herein that demonstrate different ways of catching the rest of the participants back up to the live conference point.

In some embodiments, a selectable indicator, also known as a buffering indicator, is displayed to a muted participant who is attempting to talk to the other participants of an audio/video conference. In some examples, the buffering indicator indicates to the muted participant that their voice is being recorded and they are currently muted, so their voice data is not being transmitted to the rest of the participants of the conference. After selecting the indicator, the user may transmit the playback of the recorded voice data to the other participants. In this way, the user does not have to repeat themselves and the other participants will be able to hear what the muted participant said while muted. In some examples, the playback rate of the recorded voice data is based on a time taken to select the selectable indicator, such that the longer the selectable indicator is displayed, the faster the rate of playback of the recorded voice data.

In some embodiments, other actions may also occur upon selecting the buffering indicator, i.e. for example, switching the user from a first (e.g., a muted) state to a second (e.g., an unmuted) state. In this way, the system ensures that the participant's voice data is transmitted and playback initiated according to any rules set out by the organizer, without any further input from the participant.

In some embodiments, the playback rate of the voice data transmitted to the other participants can be altered in a number of ways. For example, in some embodiments, the audio/video conferencing system manipulates the buffering bar (the lag behind the live conference) by removing pauses between the words of the voice data. In some embodiments, the conferencing system varies the playback rate by removing at least one of a plurality of filler words, also known as discourse markers, pause fillers, or hesitation forms. Common examples of filler words include "uh," "um," "er," "ah," "okay," "like," "right," "so," and "you know" but many other such discourse markers or filler words exist and vary based on language, dialect or accent; therefore, this list should not be taken to be complete. In some examples, the system may use artificial intelligence (AI) to shorten a sentence. For example, the sentence "No, I have not done that yet, sorry" could be shortened to "No, sorry."

In some embodiments, the playback rate of the recorded voice data is capped at a threshold, beyond which the rate doesn't increase any further. In some examples, the playback rate of the recorded voice data is based on the time taken to select the buffering indicator. In some examples, the playback rate may be too fast to understand (i.e., there will a limit beyond which the recorded voice data will no longer be intelligible). In addition, different participants will have a different natural speed at which they speak. Therefore, in some embodiments, each participant may have a predetermined threshold of a playback rate of their recorded voice data, or an adaptable threshold of playback rate. In some examples, the adaptable threshold is based on historic data of playback rates of the recorded voice data for a particular participant of the audio/video conference.

Likewise, in some embodiments, the removal of filler words, pauses in speech, or unnecessary language is also limited to a point beyond which the recorded speech is no longer intelligible. In some embodiments, the threshold has a tunable aggression factor, which will be explained in more detail below.

Advantages of the present disclosure allow for a participant to avoid repeating what they said on mute, and/or reduce the inefficiencies of audio/video conferences that created by participants speaking while muted.

BRIEF DESCRIPTION OF THE DRAWINGS

The above and other objects and advantages of the disclosures will be apparent upon consideration of the following detailed description, taken in conjunction with the accompanying drawings, in which:

FIGS. 2A and 2B illustrate an exemplar buffering bar that is increasing in length as the participant speaks, as used in some embodiments of the disclosure.

FIG. 4 illustrates an exemplar buffering bar with a selectable indicator, as used in some embodiments of the disclosure.

FIG. 6 is a flowchart of illustrative steps involved in transmitting a modified version of recorded speech to a conference if it is determined that a participant was muted when speaking, in accordance with methods and embodiments of the disclosure.

DETAILED DESCRIPTION

Methods and systems are provided herein for enabling the transmission of the voice data of a participant of an audio/video conference that is recorded when they are muted.

Figure 1:
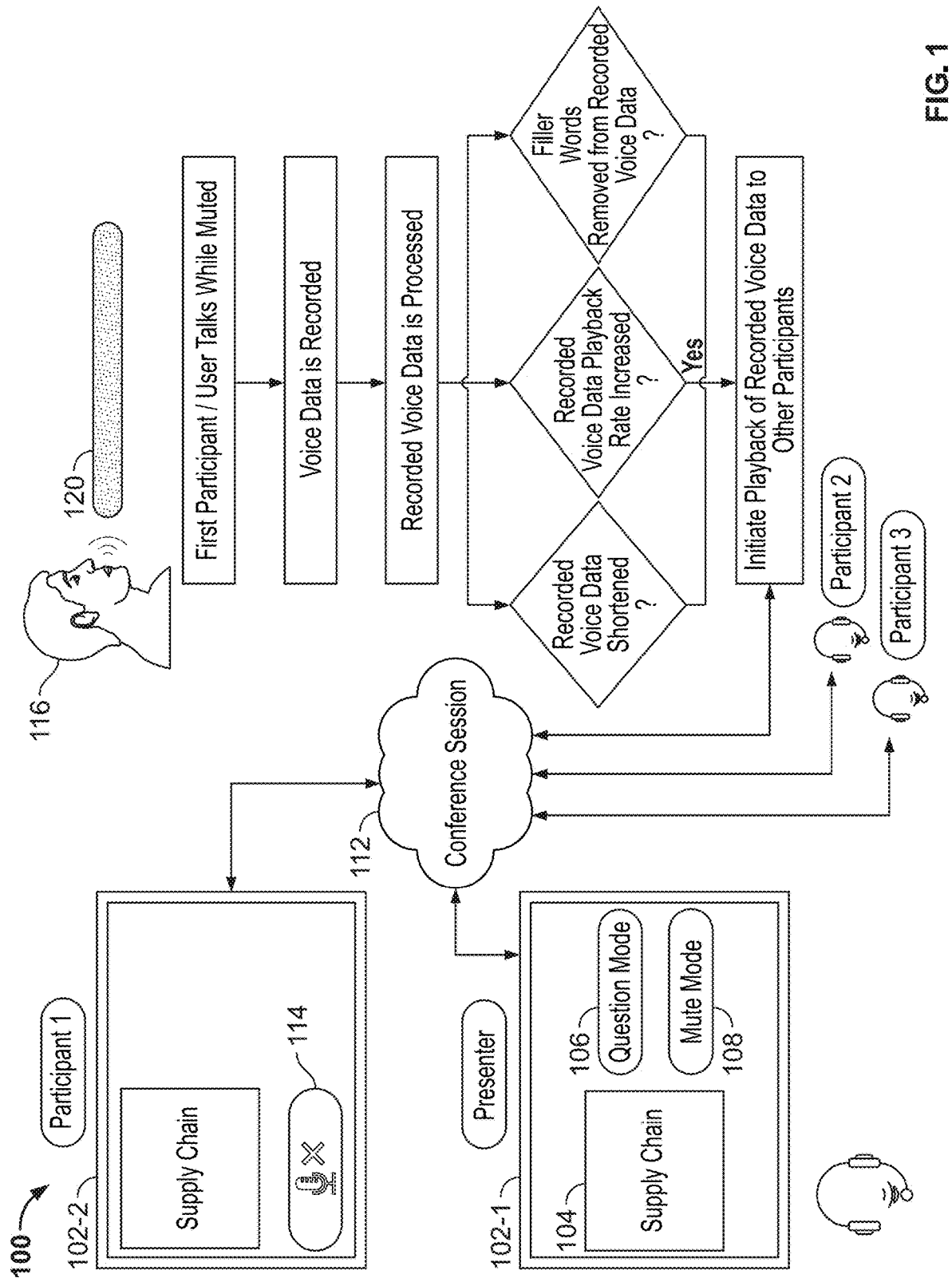
FIG. 1 illustrates an example audio/video-conferencing system, in accordance with some embodiments of the disclosure

FIG. 1. depicts an exemplary audio/video conference setup 100 with participants 1-3 connected with a presenter via a conference session 112. An example display screen 102-1 of the presenter that is provided on a display of a user device in communication with a server displays a number of selectable menu options for management of the audio/video conference. For example, selectable menu option 106 indicates to the other participants (e.g., Participants 1-3) that the presenter is ready to take questions. Selectable menu option 108 may be a "Mute" mode in which all participants connected to the audio/video conference are muted. In an embodiment, user equipment 102-2 displays a button 114 indicating that the presenter has engaged the "mute" mode.

some examples, a first user (e.g., Participant 116) may ask a question using their audio input equipment (e.g., headset with a microphone).

Specifically, in accordance with an embodiment of the disclosure, when the presenter selects "mute" mode 108, questions asked by a first user connected to the conference (e.g., participant 116) are prevented from being immediately transmitted to all of the participants connected to the audio/video conference because the participant 116 is muted, through the presenters actions. Instead, the questions are recorded for delayed transmission. In some examples, the question may be recorded and stored on the user equipment 102-2 associated with the participant asking the question (e.g., participant 116). In another examples, the question may be recorded and stored on a cloud server 112.

In some examples, the conferencing system then displays a buffering bar 120, which may include a selectable indicator (not shown) as discussed with reference to FIG. 4.

In some examples, the question is transmitted when the participant 116 selects the selectable indicator. In some examples, the presenter can observe that the participant 116 has been shown a selectable indicator and can choose to transmit the recorded voice data (the question). In some examples, upon the participant selecting the selectable indicator, the playback of recorded voice data is initiated and the recorded voice data may be shortened, the playback rate may be increased or the filler words in the voice data may be removed. For example, the system may look for filler words such as "uh," "um," "er," "ah," "okay," "like," "right," "so," and "you know" or the like spoken by the participant 116 and remove them. In some examples, the system does not transmit the recorded question (recorded voice data) when a predetermined buffer threshold (not shown) as discussed with reference to FIG. 4 has been reached (e.g., when 30 or more seconds have passed since the selectable buffering indicator was shown to the participant 116).

Once one of the above conditions is met, the system transmits the recorded question to the participants connected to the conference. For example, the system may transmit the audio recording of the question to all participants connected to the conference in accordance with one embodiment of the disclosure. In some examples, the audio question may be transmitted only to the presenter. In some examples, a transcript of the audio question may be transmitted to all the participants connected to the conference. In some examples, the system provides the participant 116 an option to delete the recorded voice data and buffering bar. This allows for the first user to revisit the question to check for its relevance if, for instance, the question has since been answered by the presenter. The resulting discussion is therefore more productive for all participants of the conference, thereby increasing efficiency.

In some examples, the recorded voice data is stored on a cloud-based server 112. In some examples, the recorded voice data is stored locally on the participant's computer/device. Whether the recorded voice is stored on a cloud-based server 112 or locally may depend on the type of processing that is provided on the recorded voice data. For example, if a low level aggression shortening of buffering bar 120 is performed, this may consist of playing the recorded voice data back at an increased rate, which would require relatively low compute power to perform and could therefore be carried out on a wide variety of devices. In another example, if a high level of aggression shortening of the buffering bar 120 is performed, this may consist of complex natural language processing, which would require relatively high compute power to perform and be more efficiently performed on a cloud based server 112 with such compute resources. In some examples, the amount of the length of the buffering bar 120 that is transferred to the cloud server 112 is less if the majority of the shortening of the buffer is performed locally; however, on the other hand, the devices of the different participants of the audio/video conference will perform more demanding compute instructions at different rates. In addition, for good, high-accuracy, artificial intelligence and natural language processing, a lot of data is needed, which is better collated at a cloud-based server 112.

In some examples, the voice data of participants may have a priority level. In some examples, certain participants (e.g., participant 2), have a higher voice data priority than the other attendees of the audio/video conference, or an organizer might have a higher priority voice data than all other participants. In some examples, if there is a conflict of two, or more, recorded voice data from two or more participants with the same priority voice data the system may prompt the current presenter to choose which voice data to play.

FIGS. 2A and 2B depict an example buffering indicator showing a first participant 116, a mute indicator 210 and buffering bars 120, 125. During an audio/video conference, when the first participant 116 begins to speak while muted, as shown by mute indicator 210, the conferencing software displays a buffering bar 120 indicating that the voice of the first participant 116 is being recorded. In some examples, collectively, the mute indicator 210 and the buffering bar 120 are known as a buffering indicator. The buffering indicator is displayed to a muted participant who is attempting to talk to the other participants of an audio/video conference. The buffering indicator may indicate to the participant that their voice is being recorded and they are currently muted, as shown by mute indicator 210. This allows the participant 116 to know their voice data is not being transmitted to the rest of the participants of the conference. In some examples, the recorded voice data of the first participant 116 is not sent to the rest of the participants of the audio/video conference automatically. Instead, as the first participant continues to talk, the buffering bar increases in length, as illustrated by longer buffering bar 125.

In some examples, the audio/video audio conference system automatically records everything the muted participant 116 is saying while in the muted state as indicated by mute indicator 210, i.e., the voice data of the participant 116 is recorded whether or not they are attempting to transmit their speech. In this way, an efficient way of delivering the audio and/or video of the muted participant 116 to the conference and the rest of the participants without requiring the current participant to repeat their speech can then be provided.

In some examples, the recording of the voice data of the first participant 116 begins at the same time the buffering bar 120 is shown, i.e., when it is determined that the first participant is speaking while muted. In some examples, the recording of the voice data of the participant 116 is initiated upon them joining the audio/video conference, and a "marker" is created when it is determined that participant 116 is talking while muted. In the latter case, when it is determined that the first participant 116 is talking while in a muted state, as shown by the mute indicator 210, the buffering bar 120 is then a representation of the time it is determined the first participant 116 has been talking while muted. In some examples, the voice data of all participants may be recorded, or only that of selective participants, such as panellists or the organizer/presenter of the audio/video conference, or a person of interest.

Identifying that the participant 116 is talking while muted can be determined in a number of ways. For example, there may be a noise limit minimum, such as a decibel minimum or the like, which is exceeded when the participant 116 begins talking. In some examples, the noise (or sound) limit minimum is greater than a determined background noise of the environment the participant 116 is in. Often, when a participant 116 is attempting to talk while muted in the audio/video conference, the participant is facing their computer/device; therefore the noise level at that time is going to be a relatively higher compared to the noise level if they were talking to another person in the room and facing away from the computer/device. In some examples, a normal noise level when talking, measured in decibels or the like, is established for the participant 116 to determine they are attempting to talk to the conference while in a muted state. In some examples, the organizer/presenter of the audio/video conference may mandate that all participants are recorded while muted, in their entirety; therefore, the same noise level limit can be used to determine when to begin showing the buffering indicator.

Identifying that the participant 116 is talking while muted can be determined in a number of ways. For example, there may be a noise limit minimum, such as a decibel minimum or the like, which is exceeded when the participant 116 begins talking. In some examples, the noise (or sound) limit minimum is greater than a determined background noise of the environment the participant 116 is in. Often, when a participant 116 is attempting to talk while muted in the audio/video conference, the participant is facing their computer/device; therefore the noise level at that time is going to be a relatively higher compared to the noise level if they were talking to another person in the room and facing away from the computer/device. In some examples, a normal noise level when talking, measured in decibels or the like, is established for the participant 116 to determine they are attempting to talk to the conference while in a muted state. In some examples, the organizer/presenter of the audio/video conference may mandate that all participants are recorded while muted, in their entirety; therefore, the same noise level limit can be used to determine when to begin showing the buffering indicator.

Figure 3A:
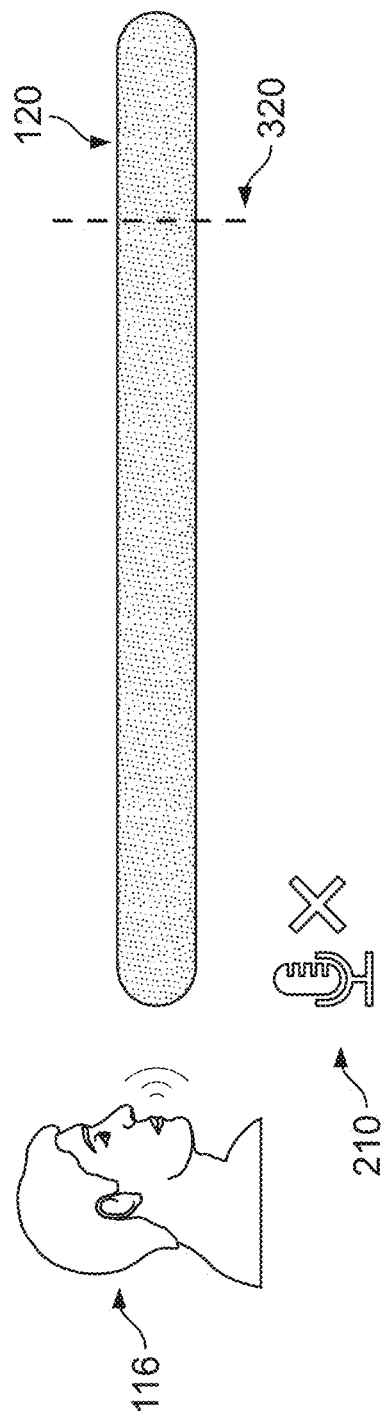
FIGS. 3A and 3B illustrate an exemplar buffering bar that crosses a threshold length and a buffer that is to be deleted, as used in some embodiments of the disclosure.
Figure 3B:
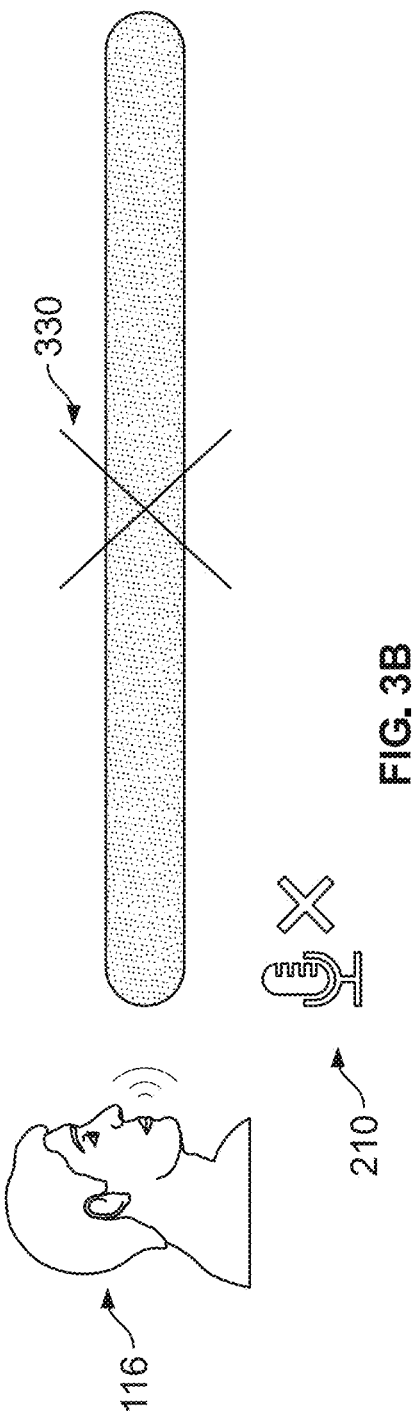

FIGS. 3A and 3B depict an exemplary buffering indicator showing a first participant 116, a mute indicator 210, buffering bar 120, a buffer threshold 320 and deletion indicator 330. In some examples, if the participant 116 continues to talk while muted, or if they do not pay attention to the buffering bar 120, the buffer will continue to increase in size until it reaches a buffer threshold 320. As the buffering bar 120 continues to grow, because the participant 116 is still talking, it will eventually pass the buffer threshold 320. In some examples, at the buffer threshold 320, it is assumed that the participant 116 is not intending to speak to the conference and the other participants. Indeed, the participant 116 maybe communicating with someone locally and is actually intending to remain muted for the purposes of the audio/video conference. Therefore, in some examples, when a length of the buffer exceeds the threshold 320, the buffering bar 120 is deleted, as shown by deletion indicator 330, which informs the user that the buffering bar 120 is to be deleted.

In some examples, after the deletion of the buffering bar 120, the recording of the voice data of the first participant 116 stops. In the examples wherein the organizer mandates that recording is mandatory for the participant 116 and the buffering bar 120 instead indicates a period of time since a "marker" was created, after the deletion of the buffering bar 120, the marker is also deleted.

In some examples, the threshold 320 is configurable by the presenter or organizer of the audio/video conference. For example, the threshold 320 may be a time limit. In some examples, the participant 116, while muted, has up to 45 seconds until an assumption is made that the user intends to remain muted and the buffering bar 120 is deleted.

In some examples, while in the muted state as shown by mute indicator 210, natural language processing, artificial intelligence, or a combination of both is used to determine that the content of what the participant is saying is irrelevant to the conference and the participant is intending to remain muted. Therefore, the threshold 320 may automatically shorten. In some examples, the threshold 320 decreases to a point that the buffering bar 120 is longer than the threshold 320.

FIG. 4 depicts an exemplary buffering indicator showing a first participant 116, a mute indicator 210, buffering bar 120, a selectable indicator 420, and threshold 320. In some examples, there is provided a selectable indicator 420. In FIG. 4, the selectable indicator 420 is shown as a "send" button. In some examples, the selectable indicator 420 is a part of the buffering indicator along with buffering bar 120 and mute indicator 210. After selecting the selectable indicator 420, by pressing the send button for example, the playback of the recorded voice data is initiated. In some examples, initiating playback of the recorded voice data comprises transmitting the voice data to the other participants of the audio/video conference. In this way, the participant 116 does not have to repeat themselves and the other participants will be able to hear what the muted participant said while muted.

In some examples, as the participant 116 begins talking, the buffering bar 120 will begin to increase in size, as shown by longer buffering bar 125, as discussed above. However, in some examples, as long as the length of the buffering bar 120 is less than the buffer threshold 320, then a selectable indicator 420 is shown to the participant 116. The participant can select the selectable indictor 420 to send the speech and/or recorded voice data to the other participants in the audio/video conference and thereafter continue talking as normal.

In some examples, the voice data of participants may have a priority level. In some examples, certain participants, for example panelists of a conference, have a higher voice data priority than the attendees of the audio/video conference, or an organizer may have a higher priority voice data than all other participants. In some examples, the system may prompt the current presenter to choose which one of two or more recorded voice data has priority if there is a conflict of two, or more, recorded voice data from two or more participants with the same priority voice data.

Figure 5A:
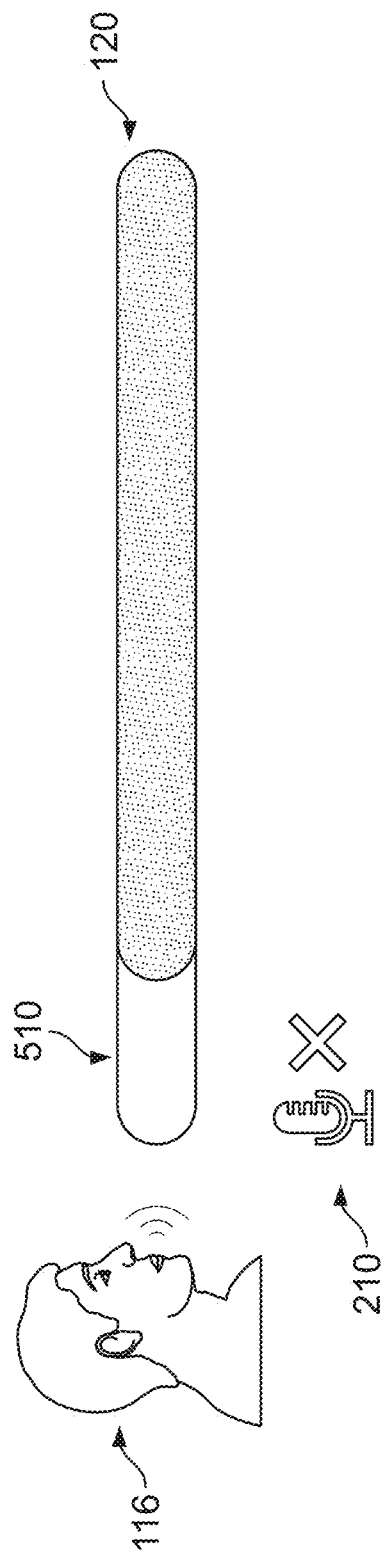
FIGS. 5A and 5B illustrate an exemplary buffering bar with a reducing length.
Figure 5B:
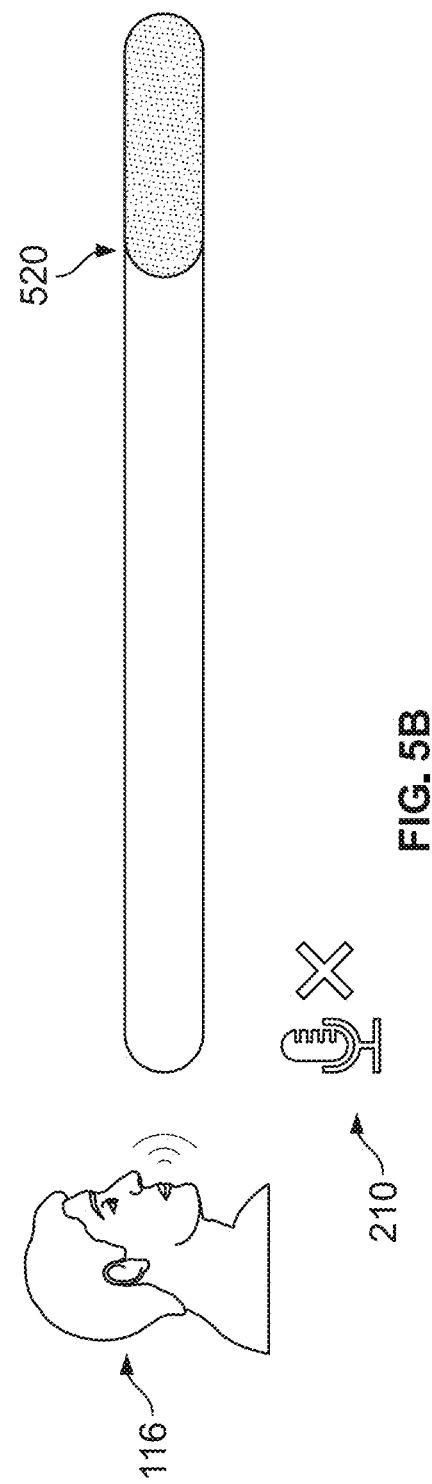

FIGS. 5A and 5B depict an exemplary buffering indicator showing a first participant 116, a mute indicator 210, buffering bar 120, a current playback position 510, and a later current playback position 520. In some examples, when the playback of the recorded voice data of the participant 116 is initiated, there will be a lag between the live voice data (what the participant is currently saying) and the transmitted recorded voice data (what the rest of the participants are listening to) because there is a time between the muted participant 116 talking and selecting the selectable indicator 420, as discussed above with reference to FIG. 4. The lag between what the transmitted recorded voice data of the participant 116 and what the rest of the participants are hearing may be shown as a current playback position 510. That is to say that the current playback position 510 is shown on the buffering bar 120. The lag between live voice data and the current playback position of the recorded voice data is shown until the rate of playback catches back up to the live point, as illustrated in FIG. 5B. Therefore, in some examples, an indication of the lag is shown until the other participants are listening to live voice data.

In some examples, the playback rate of the recorded voice data is variable. Once the other participants of the conference begin listening to the recorded voice data of the participant 116, they will be behind the current live audio/video conference, the variable playback rate of the recorded voice data allows the other participants to get back to the live audio/video conference. In some examples, the muted participant 116 will be the only attendee of the audio/video conference who is live; the other participants will be lagging behind. Therefore, in some embodiments, the system tries to catch the rest of the participants back up to the current participant's live speech point. The variable playback rate can be achieved in a number of ways, which will be discussed in more detail below.

The playback rate of the recorded voice data may be based on a length of time it takes the participant to select the selectable buffering indicator 420, as discussed with regard to FIG. 4, such that the longer the time taken to select the selectable indicator 420, the faster the playback rate of the recorded voice data will be. Therefore, in some examples, the playback rate of the recorded voice data is greater than a recorded rate of the voice data. For example, the playback rate may be a multiple of the recorded rate, such as x1.1 or x1.2. In another example, the playback rate might be 15% faster than the recorded rate. In another example, the time taken to listen back to the recorded voice data might be shorter than the time taken to record the voice data, e.g., the length of the playback might may be 90% the length of the recorded voice data.

In some examples, the rate of playback of the recorded voice data is varied not by increasing the playback speed, but by shortening the length of the recorded voice data, such that the overall effect of a shorter playback length than recorded length is achieved. In some examples, the audio/video conference system utilizes natural language processing, artificial intelligence or a known algorithm to recognize any known filler words and remove them from the recorded voice data, resulting in a shorter voice data playback. In some examples, the rate of playback may also be increased; however, the removal of the filler words alone may be sufficient to catch the other participants back up to the live audio/conference.

In some examples, natural language processing or artificial intelligence may be used to remove unnecessary text or language used by the muted participant. For example, "Yes, that is no problem, I can do that" may be shortened to "Yes, I can do that." In some examples, the pauses in between words may also be removed to reduce the overall length of the recorded voice data of the participant 116.

Any one or more of these techniques to shorten the length of the recorded voice data, shortening of the buffering bar 120, or increasing the playback rate of the buffer can be used in the systems and methods described either alone or in any combination, which may be selected automatically or predetermined by an organizer of the audio/video conference.

In some examples, the aggressiveness of the chosen technique to shorten the buffer, or increase the rate of playback for the recorded voice, may depend on the length of the buffering bar 120. In some examples, the aggressiveness is dependent on other factors, such as a pre-determined level of aggression chosen by an organizer or presenter of the audio/video conference. For example, a buffering bar 120 (and therefore recorded voice data length) of 10 seconds will likely benefit more from an increased playback rate of x1.2, compared to the removal of filler words, as there may not be any in a relatively short buffering bar 120 (and therefore recorded voice data), i.e. whereas, a buffering bar 120 of 30 seconds may have some 5 seconds of filler words and 10 seconds of unnecessary language, and would benefit greatly from their removal and therefore does not require a playback rate increase to catch the other participants back up to the live audio/video conference.

In some examples, the rate of playback is capped at a shortening threshold or upper aggression level, beyond which the rate or aggression level doesn't increase any further. In some examples, if the playback rate of the recorded voice data is based on the time taken to select the selectable buffering indicator 420, the playback rate may be increased to a point where it becomes too fast to understand (i.e., there will be a limit beyond which the recorded voice data will no longer be intelligible).

In addition, different participants will have a different natural speed at which they speak. In some examples, each participant may have a predetermined threshold 320 of a playback rate of their recorded voice data, or an adaptable threshold 320 of playback rate, based on historic data. Likewise, in some examples, the removal of filler words, pauses in speech, or unnecessary language is also limited to a point beyond which the recorded speech is no longer intelligible. In some examples, the threshold 320 has a tunable aggression level.

In some examples, the playback cap is determined based on feedback of the other participants in the audio/video conference. For example, if the recorded voice data is shortened to 80% of its original length, a poll or the like can be created and presented to the participants to determine the quality of the shortening. In some examples, the results of the poll, or the like, indicating how comprehensible the playback of the voice data was, may determine the level of aggression of the shortening used on the recorded voice data. In some examples, if it is indicated that the shortening was comprehensible by all participants, or a majority, the level of aggression of the shortening is saved for the participant 116 for a later event. Therefore, in the scenario wherein the participant 116 leaves themselves on mute again, a next recorded voice data can be shortened with the same level of aggression. In some examples, the level of aggression of shortening on the next recorded voice data can be changed (increased or decreased) and the other participants polled, or the like, again to determine whether the changed level of aggression was an improvement over the previous level of aggression used. In this way, the methods and systems herein learn that a shortening to 80% was comprehensible for the participant 116, but a shortening of the recorded voice data to 70% was too aggressive.

FIG. 6 depicts a flowchart of a process 600 of illustrative steps involved in determining whether a recorded voice data is to be transmitted to other users of a conference, in accordance with some embodiments disclosed herein. It should be noted that process 600 or any step thereof could be performed on, or provided by, any of the devices shown in FIG. 9 and can incorporate various user interfaces. For example, process 600 may be executed by control circuitry 928 (FIG. 9) of the user equipment 918. In addition, one or more steps of process 600 may be incorporated into or combined with one or more steps of any other process or embodiment.

At 602, voice data is recorded of a first user of a plurality of users connected to a conference. At 604, it is determined if the first user is talking while in a first state (e.g., a muted state). For example, the user has left themselves on mute by accident and has begun trying to talk to the plurality of other users connect to the conference.

At 606, the system determines whether a user has initiated playback of the recorded voice data of the first user to the plurality of other users. If it is determined that the user has not initiated playback, e.g., by not selecting the buffering indicator 420 as discussed with reference to FIG. 2 (NO at 606), the system proceeds to 610, and transmission of the audio voice data to the plurality of other users is prevented. If, on the other hand, it is determined that the user has initiated playback of the recorded voice data of the first user to the plurality of the other users (YES at 606), the system proceeds to 608. At 608, a shortened version of the voice data (in accordance with the methods discussed herein above) is transmitted to the plurality of other users. In this way, the voice data is transmitted after the first user was muted.

In some examples, the first participant 116 has to wait for the other participants of the audio/video conference to catch up to a live point in the conference. In other examples, this will not be required because the variable playback rate of the recorded voice data enables the other participants to catch up to the first participant 116 while they are still talking.

Figure 7:
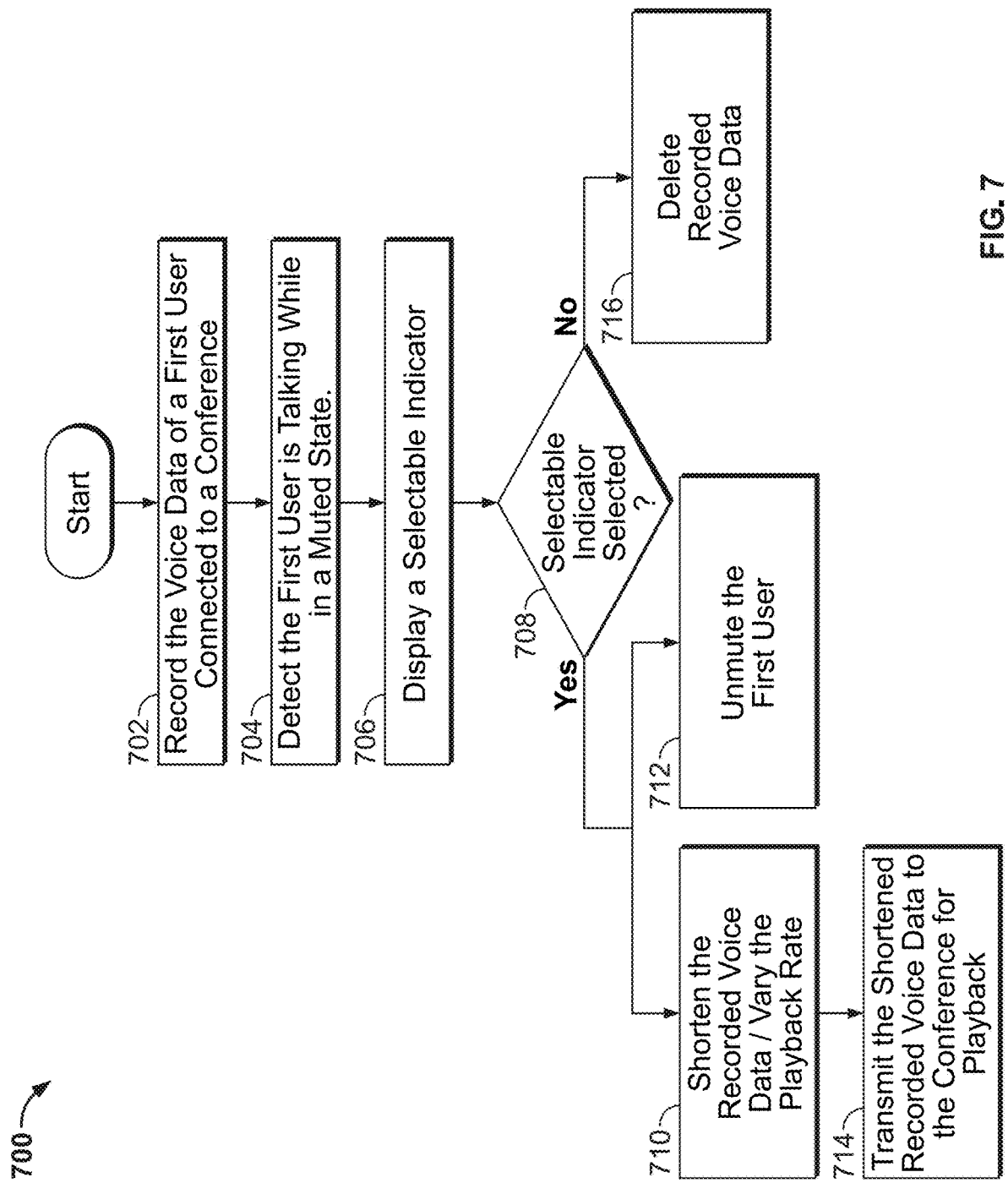
FIG. 7 is a flowchart of illustrative steps involved in transmitting a shortened version of recorded speech to a conference if a selectable indicator is selected, in accordance with methods and embodiments of the disclosure.

FIG. 7 is a flowchart of a process 700 of illustrative steps involved in transmitting a shortened version of recorded speech to a conference if a selectable indicator is selected, in accordance with methods and embodiments of the disclosure. It should be noted that process 700 or any step thereof could be performed on, or provided by, any of the devices shown in FIG. 1 or 9 and can incorporate various user interfaces (e.g., display screens 102 of FIG. 1). For example, process 700 may be executed by control circuitry 928. In addition, one or more steps of process 700 may be incorporated into or combined with one or more steps of any other process or embodiment (e.g., process 100 of FIG. 1, process 600 of FIG. 6, or process 800 of FIG. 8).

At process step 702, the voice data of a first user connected to a conference is recorded. For example, participant 1 of FIG. 1, upon joining the conference, has all of their voice data recorded through a microphone, headset or the like. At process step 704, the system detects whether the first user is talking while in a first state, such as a muted state. For example, as shown in FIG. 1, participant 1 asks a question during a conference while muted. At process step 706, a selectable indicator is displayed. For example, the selectable indicator 420 as discussed with reference to FIG. 4, which may be a send button, is displayed to the participant 116 or to a presenter/organizer of the audio/video conference. At process step 708, the system determines whether the selectable indicator has been selected. For example, the first user has selected the selectable indicator. In some examples, as discussed with reference to FIG. 4, the selectable indicator is shown to the presenter/organizer of the conference and they can also select the selectable indicator, which is also considered in process step 708.

If it is determined that the selectable indicator has been selected (YES at 708) then the process proceeds to step 710. At 710, the recorded voice data is shortened, or the playback rate of the voice data is varied, according to any of the embodiments and examples discussed herein. At 712, the first user is unmuted. For example, the first user selects the selectable indicator and is automatically unmuted so that they can continue talking. In some examples, and as shown here in FIG. 7, process steps 710 and 712 can be carried out in parallel for a more efficient process. Indeed, many of the steps herein may be done in parallel or in an order different from that as discussed herein; the process is intended to be illustrative and is not intended to exclude steps that are taken in a different order or in parallel that are not shown. At 714, the shortened recorded voice data is transmitted to the conference for playback. For example, after selecting the selectable indicator 420, the first user may continue talking and will be automatically unmuted and their recorded voice data shortened and transmitted to the rest of the conference participants for playback.

If it is determined that the selectable indicator has not been selected (NO at 708) then the process continues to 716, and the recorded voice data is deleted. In some examples, process 716 consists of preventing the transmission of the recorded voice data to the plurality of users connected to the conference, but the recorded voice data is not deleted. In this way, the system ensures that the voice data of all participants is still available after the conference has ended and no voice data is lost. The voice data can then be reviewed after the conference by the organizer/presenter.

Figure 8:
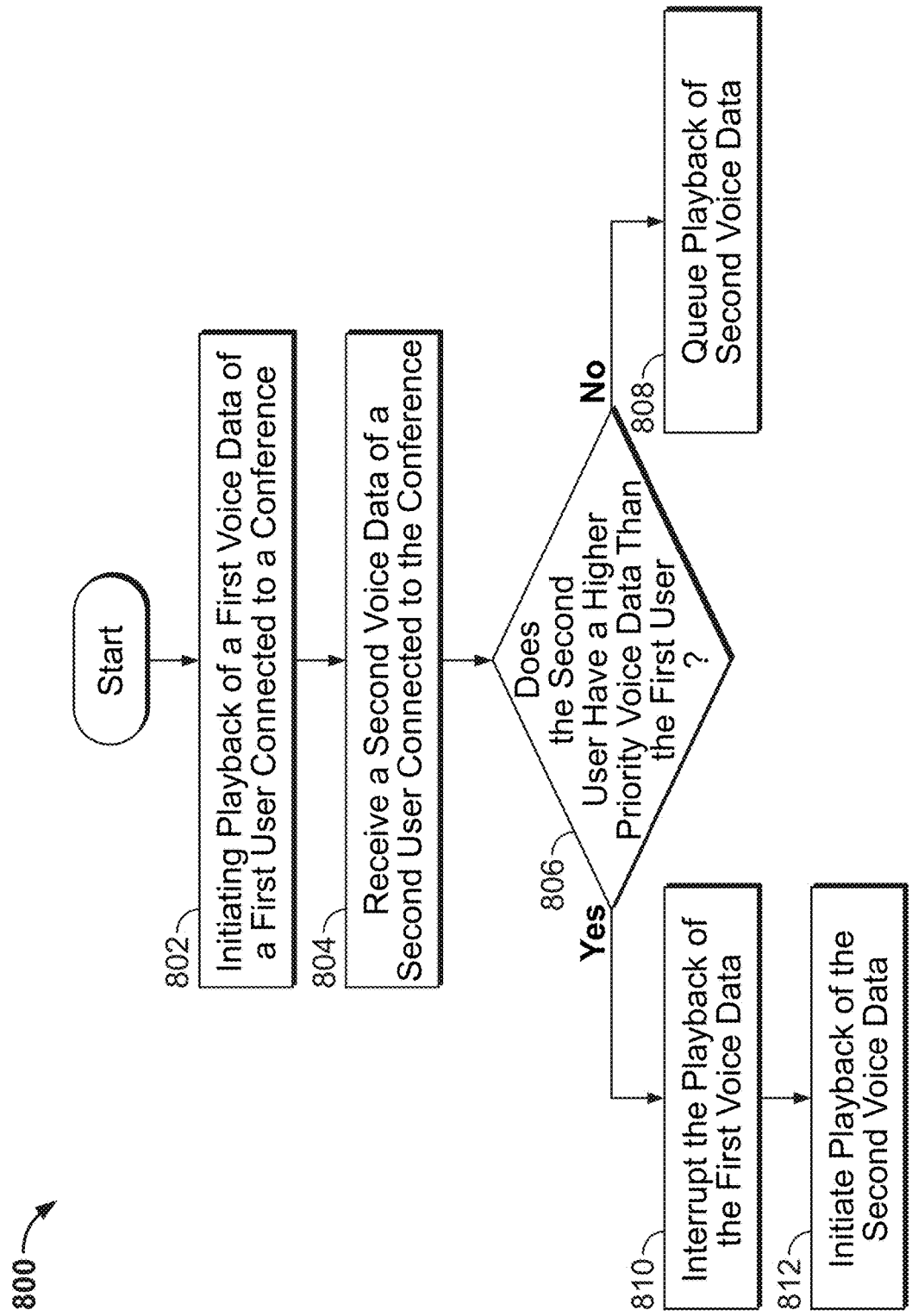
FIG. 8 is a flowchart of illustrative steps involved in initiating playback of two voice data with different priorities, in accordance with methods and embodiments of the disclosure.

FIG. 8 is a flowchart of a process 800 of illustrative steps involved in initiating playback of two voice data with different priorities, in accordance with methods and embodiments of the disclosure. It should be noted that process 800 or any step thereof could be performed on, or provided by, any of the devices shown in FIG. 1 or 9 and can incorporate various user interfaces (e.g., display screens 102 of FIG. 1). For example, process 800 may be executed by control circuitry 928. In addition, one or more steps of process 800 may be incorporated into or combined with one or more steps of any other process or embodiment (e.g., process 100 of FIG. 1, process 600 of FIG. 6, or process 700 of FIG. 7).

At process step 802, playback of a first voice data of a first user connected to a conference is initiated. For example, as shown in FIG. 1, participant 116 asks a question during a conference and the voice data of that question is processed according to any of the embodiments or examples discussed herein. Thereafter, the processed voice data is transmitted to the other participants, and the voice data of the first participant 116 is initiated. At process step 804, the system receives a second voice data of a second user connected to the conference. For example, another user of the conference begins to talk while the playback of the first voice data has already been initiated. At 806, the system determines if the second user has a higher-priority voice data than the first user. For example, the system checks a voice priority of the first user against a second user and determines which is higher, by referencing a voice priority list or the like.

If it is determined that the second user does not have a higher priority voice data than the first user (NO at 806) then the process continues to step 808. At 808, the voice data of the second user is queued to be played back. In some examples, the second voice data can be processed according to any of the examples and embodiments discussed herein, such as, for example, varying the playback speed of the second recorded voice data or removing filler words of the second voice data. In additional examples, the processing of the second voice data happens in parallel to the playback of the first voice data. In some examples, the playback of the second voice data is automatically initiated after the playback of the first voice data ends.

If it is determined that the second user does have a higher priority voice data than the first user (YES at 806) then the process continues to step 810. At 810, the playback of the first voice data is interrupted. At 812, the playback of the second voice data is initiated. In some examples, the interruption of the first voice data does not happen until the second voice data has been shortened according to any of the embodiments or examples herein. In some examples, the first voice data can continue playing after the interruption. In some examples, the playback of the first voice data is not continued after the interruption.

Figure 9:
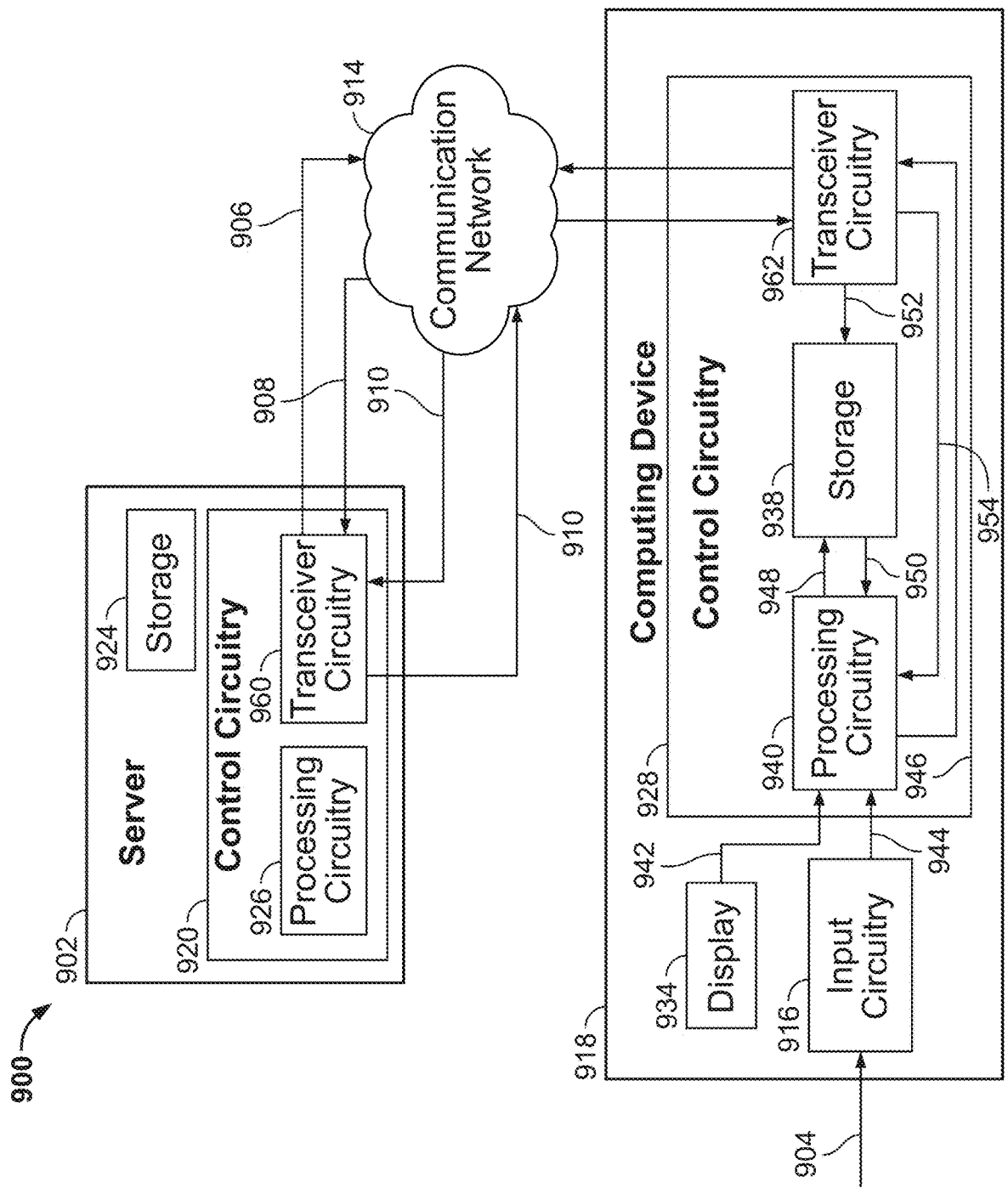
FIG. 9 is a block diagram representing devices, components of each device, and data flow therebetween for an audio/video conferencing system incorporating question management features, in accordance with some embodiments of the disclosure.

FIG. 9 is an illustrative block diagram showing an audio/video conferencing system 900 incorporating audio/video conference management features, in accordance with some examples of the disclosure. In an embodiment, one or more parts of or the entirety of system 900 may be configured as a system implementing various features, processes, and components of FIGS. 1-8. Although FIG. 9 shows a certain number of components, in various examples, system 900 may include fewer than the illustrated number of components and/or multiples of one or more of the illustrated number of components.

System 900 is shown to include a computing device 918, a server 902 and a communication network 914. It is understood that while a single instance of a component may be shown and described relative to FIG. 9, additional instances of the component may be employed. For example, server 902 may include, or may be incorporated in, more than one server. Similarly, communication network 914 may include, or may be incorporated in, more than one communication network. Server 902 is shown communicatively coupled to computing device 918 through communication network 914. While not shown in FIG. 9, server 902 may be directly communicatively coupled to computing device 918, for example, in a system absent or bypassing communication network 914.

Communication network 914 may comprise one or more network systems, such as, without limitation, an Internet, LAN, WIFI or other network systems suitable for audio processing applications. In some embodiments, system 900 excludes server 902, and functionality that would otherwise be implemented by server 902 is instead implemented by other components of system 900, such as one or more components of communication network 914. In still other embodiments, server 902 works in conjunction with one or more components of communication network 914 to implement certain functionality described herein in a distributed or cooperative manner. Similarly, in some embodiments, system 900 excludes computing device 918, and functionality that would otherwise be implemented by computing device 918 is instead implemented by other components of system 900, such as one or more components of communication network 914 or server 902 or a combination. In still other embodiments, computing device 918 works in conjunction with one or more components of communication network 914 or server 902 to implement certain functionality described herein in a distributed or cooperative manner.

Computing device 918 includes control circuitry 928, display 934 and input circuitry 916. Control circuitry 928 in turn includes transceiver circuitry 962, storage 938 and processing circuitry 940. In some embodiments, computing device 918 or control circuitry 928 may be configured as at least one of media devices 102-1 or 102-2 of FIG. 1.

Server 902 includes control circuitry 920 and storage 924. Each of storages 924 and 938 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 924, 938 may be used to store various types of content, metadata, and or other types of data (e.g., they can be used to record audio questions asked by one or more participants connected to the conference. Non-volatile memory may also be used (e.g., to launch a boot-up routine and other instructions). Cloud-based storage may be used to supplement storages 924, 938 or instead of storages 924, 938. In some embodiments, the audio portion of the conference may be recorded and stored in one or more of storages 912, 938.

In some embodiments, control circuitry 920 and/or 928 executes instructions for an application stored in memory (e.g., storage 924 and/or storage 938). Specifically, control circuitry 920 and/or 928 may be instructed by the application to perform the functions discussed herein. In some implementations, any action performed by control circuitry 920 and/or 928 may be based on instructions received from the application. For example, the application may be implemented as software or a set of executable instructions that may be stored in storage 924 and/or 938 and executed by control circuitry 920 and/or 928. In some embodiments, the application may be a client/server application where only a client application resides on computing device 918, and a server application resides on server 902.

The application may be implemented using any suitable architecture. For example, it may be a stand-alone application wholly implemented on computing device 918. In such an approach, instructions for the application are stored locally (e.g., in storage 938), and data for use by the application is downloaded on a periodic basis (e.g., from an out-of-band feed, from an Internet resource, or using another suitable approach). Control circuitry 928 may retrieve instructions for the application from storage 938 and process the instructions to perform the functionality described herein. Based on the processed instructions, control circuitry 928 may determine a type of action to perform in response to input received from input circuitry 916 or from communication network 914. For example, in response to a selection of "mute" mode, control circuitry 928 may perform the steps of processes relative to various embodiments discussed herein.

In client/server-based embodiments, control circuitry 928 may include communication circuitry suitable for communicating with an application server (e.g., server 902) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 914). In another example of a client/server-based application, control circuitry 928 runs a web browser that interprets web pages provided by a remote server (e.g., server 902). For example, the remote server may store the instructions for the application in a storage device. The remote server may process the stored instructions using circuitry (e.g., control circuitry 928) and/or generate displays. Computing device 918 may receive the displays generated by the remote server and may display the content of the displays locally via display 934. This way, the processing of the instructions is performed remotely (e.g., by server 902) while the resulting displays, such as the display windows described elsewhere herein, are provided locally on computing device 918. Computing device 918 may receive inputs from the user via input circuitry 916 and transmit those inputs to the remote server for processing and generating the corresponding displays. Alternatively, computing device 918 may receive inputs from the user via input circuitry 916 and process and display the received inputs locally, by control circuitry 928 and display 934, respectively.

Server 902 and computing device 918 may transmit and receive content and data such as media content via communication network 914. For example, server 902 may be a media content provider, and computing device 918 may be a smart television configured to download or stream media content, such as a YouTube video, from server 902. Control circuitry 920, 928 may send and receive commands, requests, and other suitable data through communication network 914 using transceiver circuitry 960, 962, respectively. Control circuitry 920, 928 may communicate directly with each other using transceiver circuits 960, 962, respectively, avoiding communication network 914.

It is understood that computing device 918 is not limited to the embodiments and methods shown and described herein. In nonlimiting examples, computing device 918 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media centre, a handheld computer, a stationary telephone, a personal digital assistant (PDA), a mobile telephone, a portable video player, a portable music player, a portable gaming machine, a smartphone, or any other device, computing equipment, or wireless device, and/or combination of the same capable of suitably displaying and manipulating media content.

Control circuitry 920 and/or 918 may be based on any suitable processing circuitry such as processing circuitry 926 and/or 940, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i9 processor and an Intel Core i9 processor). In some embodiments, control circuitry 920 and/or control circuitry 918 are configured to implement a media content operation system, such as systems, or parts thereof, that perform various media content manipulation processes described herein.

Computing device 918 receives a user input 904 at input circuitry 916. For example, computing device 918 may receive a user input like a user swipe or user touch, as previously discussed. In some embodiments, computing device 918 is a media device (or player), with the capability to access media content. It is understood that computing device 918 is not limited to the embodiments and methods shown and described herein. In nonlimiting examples, computing device 918 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media centre, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

User input 904 may be received from a user selection-capturing interface that is separate from device 918, such as a remote-control device, trackpad or any other suitable user movement sensitive or capture devices, or as part of device 918, such as a touchscreen of display 934. Transmission of user input 904 to computing device 918 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 916 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 940 may receive input 904 from input circuit 916. Processing circuitry 940 may convert or translate the received user input 904 that may be in the form of gestures or movement to digital signals. In some embodiments, input circuit 916 performs the translation to digital signals. In some embodiments, processing circuitry 940 (or processing circuitry 926, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. In this specification, the following terms may be understood in view of the below explanations:

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   recording voice data of a first user connected to a conference while the first user is in a first state;
   determining the first user is talking while in the first state;
   displaying, for a time limit, a selectable buffering indicator to the first user in the first state; and
   in response to the first user selecting the selectable buffering indicator within the time limit, initiating playback of the recorded voice data of the first user to a plurality of other users, wherein a playback rate of the recorded voice data is variable, and
   wherein the first state is a muted state.

2. The method of claim 1, wherein the playback rate of the recorded voice data of the first user is based on a time the selectable buffering indicator was displayed.

3. The method of claim 1, the method further comprising:
   in response to the first user selecting the selectable buffering indicator, switching the first user to a second state.

4. The method of claim 3, wherein the second state is an unmuted state.

5. The method of claim 1, wherein the playback rate is greater than a recorded rate of the recorded voice data.

6. The method of claim 5, wherein the playback rate is capped at a certain threshold.

7. The method of claim 1, wherein the playback rate is varied by removing at least one of: pauses, hesitations, or a stuttering between words in the recorded voice data.

8. The method of claim 1, wherein the playback rate is varied by removing at least one of: filler words, discourse markers, pause fillers, or hesitation forms.

9. The method of claim 1, wherein the playback rate is varied by shortening sentences of the recorded voice data.

10. The method of claim 9, wherein the shortening of sentences is performed by at least one of: removing unnecessary language, natural language processing or artificial intelligence.

11. The method of claim 1, the method further comprising a second user, wherein the second user has a higher-priority voice data than the first user.

12. The method of claim 11, the method further comprising:
   determining the second user is talking while in a second state; and
   interrupting the playback of the recorded voice data of the first user.

13. The method of claim 12, the method further comprising determining the second user has finished talking while in the second state.

14. The method of claim 13, further comprising resuming the playback of the recorded voice data of the first user.

15. The method of claim 1, the method further comprising:
   calculating a lag time between a live voice data of the first user and the playback of the recorded voice data.

16. A system comprising:
   input circuitry; and
   control circuitry configured to:
      record, via the input circuitry, voice data of a first user connected to a conference while the first user is in a first state;
      determine the first user is talking while in the first state;
      display, for a time limit, a selectable buffering indicator to the first user in the first state; and
      in response to the first user selecting the selectable buffering indicator within the time limit, initiate playback of the recorded voice data of the first user to a plurality of other users, wherein a playback rate of the recorded voice data is variable, and
      wherein the first state is a muted state.

17. A non-transitory computer-readable medium having instructions encoded thereon for carrying out a method, the method comprising:

recording voice data of a first user connected to a conference while the first user is in a first state;
determining the first user is talking while in the first state;
displaying, for a time limit, a selectable buffering indicator to the first user in the first state; and
in response to the first user selecting the selectable buffering indicator within the time limit, initiating playback of the recorded voice data of the first user to a plurality of other users, wherein a playback rate of the recorded voice data is variable, and
wherein the first state is a muted state.

* * * * *